United States Patent [19]
Alexander et al.

[11] Patent Number: 5,787,102
[45] Date of Patent: Jul. 28, 1998

[54] LIGHT GENERATING DEVICE AND METHOD USING A PERIODICALLY STRUCTURED NON-LINEAR MATERIAL AND ORTHOGONAL OPTICAL INTERACTION

[75] Inventors: Jason L. Alexander, Foster City; Walter R. Bosenberg, Sunnyvale; Richard W. Wallace, Los Altos, all of Calif.

[73] Assignee: Lightwave Electronics Corporation, Mountain View, Calif.

[21] Appl. No.: 754,217

[22] Filed: Nov. 20, 1996

[51] Int. Cl.$^6$ .............. H01S 3/10; G02F 1/35; G02B 6/00
[52] U.S. Cl. .............. 372/22; 372/21; 372/23; 372/27; 372/102; 372/106; 359/326; 359/346; 385/122; 385/11
[58] Field of Search .............. 372/21, 22, 23, 372/24, 27, 106, 104; 359/326, 328, 329, 330, 333, 345, 346; 385/122, 11

[56] References Cited

U.S. PATENT DOCUMENTS

| | | | |
|---|---|---|---|
| 4,739,507 | 4/1988 | Byer et al. | 372/22 |
| 5,036,220 | 7/1991 | Byer et al. | 307/427 |
| 5,185,752 | 2/1993 | Welch et al. | 372/22 |
| 5,241,413 | 8/1993 | Uenishi et al. | 359/328 |
| 5,247,528 | 9/1993 | Shinozaki et al. | 372/22 |
| 5,355,247 | 10/1994 | Byer et al. | 359/330 |
| 5,519,802 | 5/1996 | Field et al. | 385/129 |
| 5,640,405 | 6/1997 | Wallace et al. | 372/21 |

OTHER PUBLICATIONS

Burns et al., "Second Harmonic Generation in Field Poled, Quasi–Phase–Matched, Bulk LiNbO$_3$," *IEEE Photonics Technology Letters*, vol. 6, Feb. 1994, pp. 252–254.

Fejer et al., "Quasi–phase matched second harmonic generation: tuning and tolerances," *IEEE Journal of Quantum Electronics*, vol. 28, No. 11, 1992, pp. 2631–2654.

Hongwei Mao et al., "Noncritical quasiphase–matched second harmonic generation in LiB$_3$O$_5$ crystal at room temperature", *Applied Physics Letters*, vol. 61, No. 10, Sep. 1992, pp. 1148–1150.

Myers et al., "Quasi–phase–matched optical parametric oscillators in bulk periodically poled LiNbO$_3$," *Journal of the Optical Society of America B*, vol. 12, No. 11, 1995, pp. 2102–2116.

Pruneri et al., "49 mW of cw blue light generated by first–order quasi–phase–matched frequency doubling of a diode–pumped 946–nm Nd:YAG laser", *Optics Letters*, vol. 20, Dec. 1995, pp. 2375–2377.

Roberts, "Simplified characterization of uniaxial and biaxial nonlinear optical crystal: a plea for standardization of nomenclature and conventions," *IEEE Journal of Quantum Electronics*, vol. 28, No. 10, 1992, pp. 2057–2074.

Taya et al., "Photorefractive effects in periodically poled ferroelectrics," *Optics Letters*, vol. 21, No. 12, 1996, pp. 857–859.

*Primary Examiner*—Brian Healy
*Attorney, Agent, or Firm*—Charles S. Guenzer

[57] ABSTRACT

A non-linear optical device in which quasi-phase matching between different optical waves of differing polarizations and refractive indices increases the interaction length between the waves. The quasi-phase matching structure includes a periodic structure over which the non-linear coefficient varies with a given period, preferably the sign of the non-linear coefficient being inverted between two alternating regions. In LiNbO$_3$, the periodic structure can be achieved by electrical poling. The required period length is increased by selecting light waves of different polarizations for the non-linear interaction such that a large portion of the dispersion between the waves of different wavelength is compensated by the birefringence of the waves of different polarization. In particular, periodic poling can quasi-phase match radiation in the range of 0.80 μm to 1.2 μm to generate second harmonic generation radiation in the blue and green visible spectrum.

26 Claims, 7 Drawing Sheets

LIGHT GENERATING DEVICE AND METHOD USING A PERIODICALLY STRUCTURED NON-LINEAR MATERIAL AND ORTHOGONAL OPTICAL INTERACTION

FIELD OF THE INVENTION

The invention generally relates to lasers. In particular, the invention relates to non-linear optical interactions converting the wavelength of an optical signal.

BACKGROUND OF THE INVENTION

Many commercially important applications require laser radiation in parts of the optical spectrum for which there are no readily available efficient and compact laser diodes or solid-state lasers pumped by laser diodes. One way to reach these other wavelengths is to use non-linear optical crystals to convert an existing laser line to another wavelength via second-harmonic generation, sum or difference generation, or optical parametric oscillator techniques.

In general, non-linear processes involve the interaction of one or more intense optical signals propagating collinearly through a non-linear medium to generate another optical signal at a desired new frequency. Consistent with the physics involved, the simplest non-linear optical interaction is usually considered to involve three signals each contributing or receiving a photon from the interaction even if two signals have the same frequency and originate from the same source. The non-linear interaction produces optical waves having frequencies equal to the sums and differences of the frequencies of the input signals. A first requirement for sum and difference frequencies is called "energy conservation" and is mathematically expressed as $$\omega_1 + \omega_2 = \omega_3 \tag{1}$$

where $\omega_1$, $\omega_2$, and $\omega_3$ represent the frequencies of the three different signals involved, which are proportional to their photon energies. Second-harmonic generation is the case of sum frequency generation where $\omega_1$ and $\omega_2$ are equal to each other and represent the fundamental frequency $\omega_{FND}$ of the optical pumping signal and where $\omega_3$ is the frequency of the output signal and represents the second harmonic $\omega_{SHG}$ of the fundamental frequency. Optical parametric gain is a case of difference frequency generation where $\omega_3$ is input as an intense optical pump signal and the other two waves are generated from quantum noise or from a low-intensity light signal. In the latter case, the two generated signals are referred to as the signal and idler outputs. Optical parametric gain is referred to as difference frequency generation because the process is used, for example, to generate or amplify a signal output at a frequency that is the difference between the frequencies of the pump and idler signals.

A fundamental problem with non-linear optical processes, however, is that the non-linear optical coefficients are relatively small so that the various input and generated signals need to interact over relatively long distances in order that significant energy be transferred between the different optical waves. Long interaction lengths with good energy transfer require a predetermined phase relationship between the three waves. This phase relationship for phase matching or momentum matching is expressed as $$k_1 + k_2 = k_3, \tag{2}$$

where $$k_i = \frac{\omega_i n_i}{c}, \tag{3}$$

and where $\omega_i$ is the wave frequency expressed in radians, $n_i$ is the refractive index of the wave in the crystal, and c is the speed of light in free space. If the two or more waves of interest can be maintained in phase over their interaction length, the intensity $I_{NL}$ of the wave generated by the non-linear interaction grows quadratically over the interaction length, as shown by plot 10 in FIG. 1.

However, the optical signals because of their different wavelengths or possibly polarizations, are likely to experience significantly different refractive indices since the refractive index in materials, particularly those materials exhibiting optical non-linearities, tends to vary with both wavelength and polarization.

Figure 2:
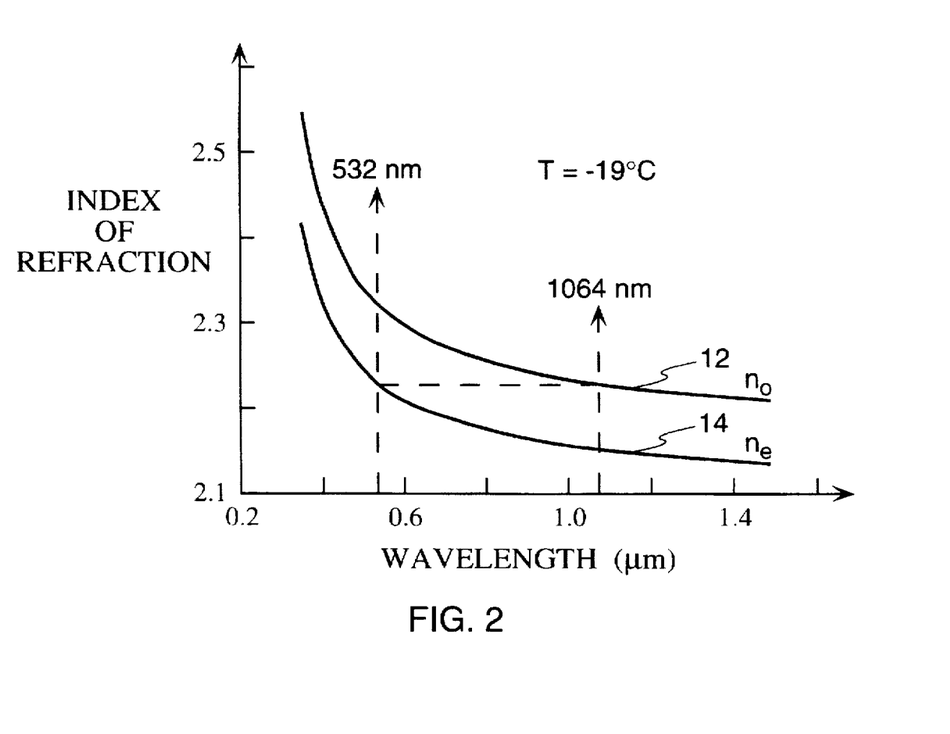
FIG. 2 is graph of the wavelength and polarization dependence of the refractive index in lithium niobate.

In FIG. 2 are shown the refractive index of $LiNbO_3$ over the wavelength range of interest for visible and near-visible light. The data presented here for $LiNbO_3$ will be for congruent $LiNbO_3$, which is actually $Li_x(NbO_3)_{1-x}$ where x has a value of about 0.95 such that the $LiNbO_3$ can be grown as a single crystal with a uniform composition.

Lithium niobate is a negative uniaxial crystal, that is, $n_o > n_e$ as will be explained immediately below. For any propagation direction in the crystal, there are two unique eigen polarizations. One lies in the x-y plane and sees the ordinary refractive index $n_o$. The other eigen polarization is perpendicular to the both the ordinary index polarization direction and to the propagation vector k. This wave sees the effective refractive index $n_e$, which is intermediate the ordinary and extraordinary indices dependent upon the angle between the extraordinary polarization direction and the propagation vector k $$n_o \leq n_e \leq n_e. \tag{4}$$

Curve 12 gives the refractive index $n_o$ in $LiNbO_3$ while curve 14 gives the refractive index $n_e$.

Figure 1:
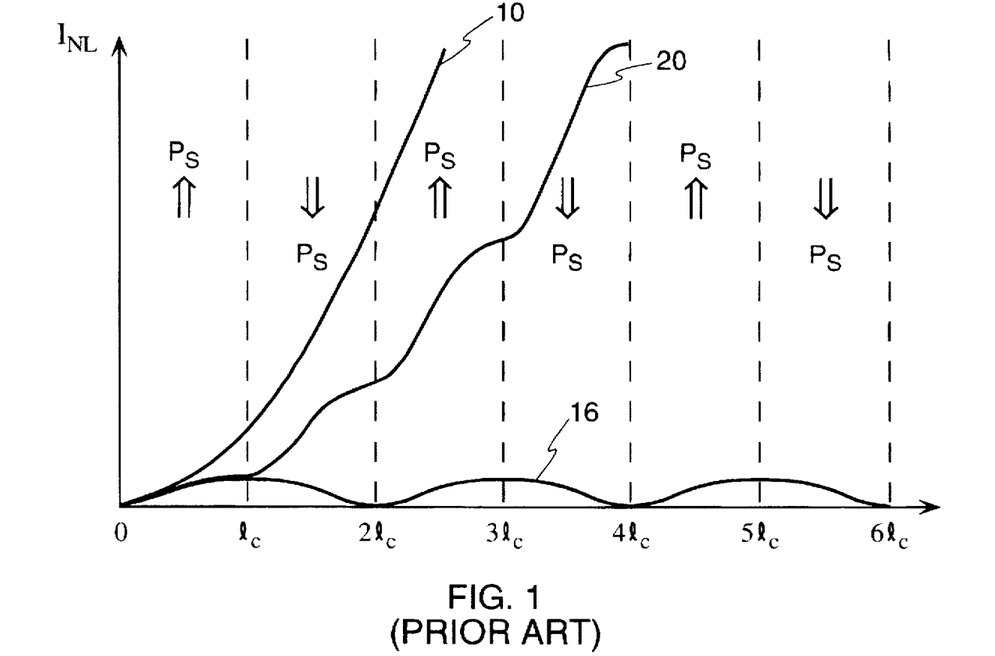
FIG. 1 is a schematic graph of the growth of non-linearly generated optical waves under several different phase matching conditions.

The variation of refractive index with wavelength is called dispersion, and the variation with polarization is called birefringence. Any dispersion or birefringence between the non-linearly interacting waves causes them to fall progressively out of phase (unless other measures are taken). The coherence length $l_c$ is defined as the length over which the non-linearly interacting waves fall out of phase by a phase angle π. For second-harmonic generation, the coherence length is given by $$l_c = \frac{\lambda}{4 \cdot (n_{SHG} - n_{FND})}, \tag{5}$$

where λ and $n_{FND}$ are respectively the wavelength and material refractive index of the fundamental wave and $n_{SHG}$ is the material refractive index of the second-harmonic wave at wavelength λ/2. In broadly stated terms, if the two waves are in phase at the start of the first coherence length, they are exactly out of phase at the start of the second coherence length. If the non-linear medium remains the same throughout the length, power is transferred from the input signal to the output signal during the first coherence length but is transferred in the other direction in the next coherence length. This oscillatory behavior of the non-linearly generated intensity $I_{NL}$ is represented by plot 16 in FIG. 1.

In general without some special condition, the coherence lengths in $LiNbO_3$ and similar materials are too short for useful non-linear effects, such as second-harmonic generation. Several methods are available, however, for obtaining effectively long coherence lengths and thus efficient energy transfer for non-linear processes.

As stated before, the refractive index varies with both polarization and wavelength, i.e., birefringence and dispersion. Under the proper circumstance, which will be referred to as bulk phase matching, birefringence can compensate for dispersion. This compensation requires that the interaction be chosen such that the fundamental and second-harmonic signals have different polarizations. That is, the interaction is between orthogonal polarization states. Returning to FIG. 2, if the fundamental signal at a wavelength $\lambda$ is ordinarily polarized with a refractive index $n_{FND}=n_o(\lambda)$, it is possible under some circumstances that the second-harmonic signal at wavelength $\lambda/2$ has an index of refraction $n_{SHG}$ that equals the refractive index $n_{FND}$ of the ordinary fundamental signal. That is, the refractive indices at the two wavelengths satisfy the condition $$n_e(\lambda/2) < n_o(\lambda) < n_o(\lambda/2). \tag{6}$$

As a result, the birefringence between the two polarizations compensates for the dispersion between the two frequencies (wavelengths). The maximum birefringence available to compensate for dispersion occurs if the second harmonic is completely extraordinarily polarized so that $n_{SHG}=n_e(\lambda/2)$. If lesser amounts of birefringence are required, the second-harmonic signal can be engineered by rotating the non-linear crystal to contain some amount of ordinary polarization, thus bringing the curves for fundamental and second-harmonic refractive indices closer together. In any case, bulk phase matching requires that $$n_e(\lambda/2) \leq n_o(\lambda) \tag{7}$$

for negative uniaxial crystals and $$n_o(\lambda/2) \leq n_e(\lambda) \tag{8}$$

for positive uniaxial crystals.

The values of refractive index shown in FIG. 2 are correct only for a particular temperature since the refractive indices change with temperature. For LiNbO$_3$ and similar materials, the two curves 12, 14 for ordinary and extraordinary refractive indices move towards each other with increasing temperature and move apart with decreasing temperature. Thus, the condition of Equation (6) is more easily satisfied at lower temperatures.

Figure 3:
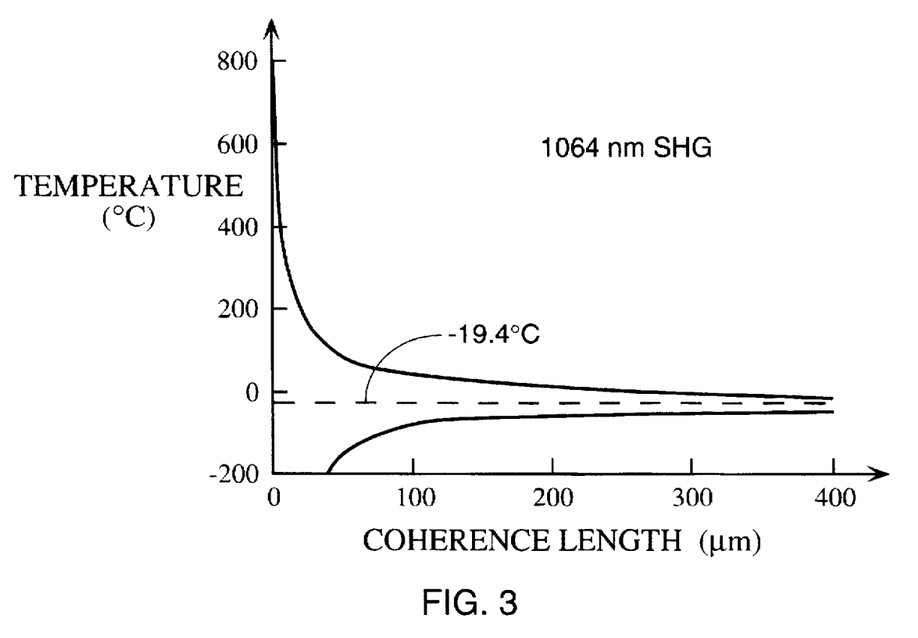
FIG. 3 is a graph of the temperature dependence of the coherence length for second-harmonic generation from a 1064 nm pump source via an ooe interaction in $LiNbO_3$.

In FIG. 3 is plotted the coherence length $l_c$ in congruent LiNbO$_3$ versus temperature for second-harmonic generation from 1064 nm light (Nd:YAG) using the ooe interaction, that is, the fundamental is ordinarily polarized and the second harmonic is extraordinarily polarized. An infinite value of the coherence length indicates bulk phase matching. It is seen that bulk phase matching for this interaction can be obtained only at a temperature of $-19.4°$ C.

Although such temperatures are obtainable and with care are operationally practical in many optical systems, they are not usable as high-power light sources because of photorefractive effects. This effect has been explained by Taya et al. in "Photorefractive effects in periodically poled ferroelectrics," Optics Letters, vol. 21, no. 12, 1996, pp. 857–859. An intense light beam in traversing a material like LiNbO$_3$ generates a large number of free electrical carriers. The free carriers can induce metastable changes in the refractive index, and because of the asymmetry of the beam in the larger material, the spatial variation of the refractive index creates a lens in the beam path that appears to scatter the light. As a result, the material increasingly distorts the laser beam upon irradiation with a high-intensity laser.

However, the refractive changes can be reversed by annealing the crystal at temperatures above about 200° C. Preferably, for second-harmonic conversion processes, the LiNbO$_3$ crystal is operated in a temperature range of 200° to 250° C. so that it is continuously self-annealing. As a result of the elevated operating temperature, the changes in refractive index cannot accumulate, and the material does not substantially distort the input radiation. For very high optical intensities, the operating temperature should range up to 300° C. to effectively suppress photo refractive damage. Clearly, the temperatures for bulk phase matching in LiNbO$_3$ for second-harmonic generation in the wavelength range of FIG. 2 are incompatible with self-annealing temperatures.

Figure 4:
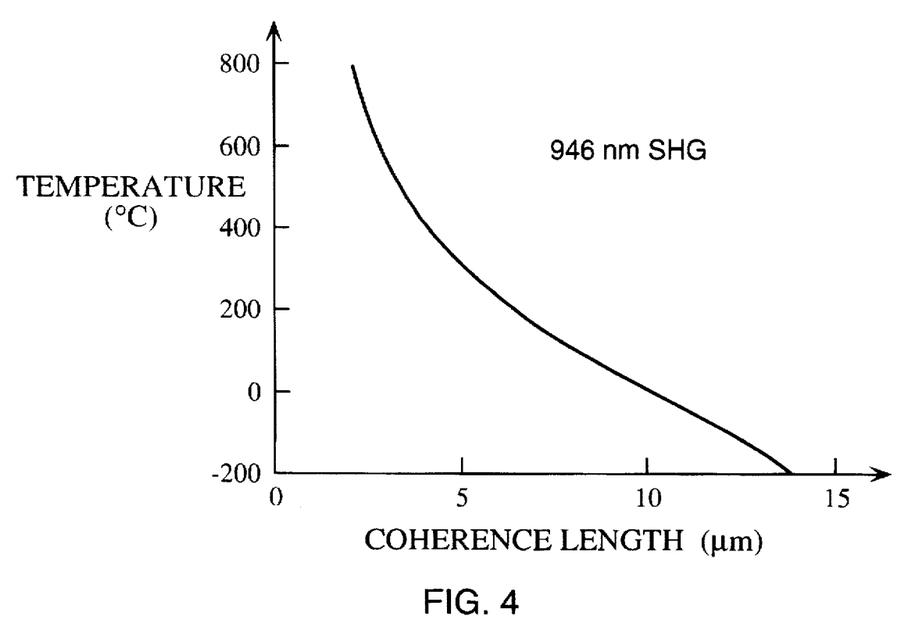
FIG. 4 is a graph similar to that of FIG. 3 but for a 946 nm pump source.

The problem worsens at the shorter wavelengths required to produce second-harmonic generation in the blue and green portions of the visible spectrum, as is evident from the quadratic increase shown in FIG. 2 in the refractive indices for shorter wavelengths. In FIG. 4 is shown a plot of the coherence length in LiNbO$_3$ versus temperature for second-harmonic generation from 946 nm light (another emission line from Nd:YAG) via the ooe interaction. Even for temperatures approaching absolute zero of $-273°$ C., bulk phase matching cannot be achieved.

Some have attempted to temperature shift the refractive index curves by adding dopants to the LiNbO$_3$ crystal to chemically tune the birefringence, an example being given by Byer et al. in U.S. Pat. No. 4,739,507, but dopants are not favored because they may make the crystal difficult to grow, may add unfavorable properties like absorption, and they offer only limited flexibility. Others have reported decreasing the photorefractive effect with dopants, for example, Bryan et al. in "Increased optical damage resistance in lithium niobate," Applied Physics Letters, vol. 44, no. 9, 1984, pp. 847–849, but this approach only delays the onset of photorefractive damage.

Quasi-phase matching (QPM) circumvents the limitations of bulk phase matching and is theoretically able to accommodate any amount of dispersion and allow phase matching at any temperature. Two of us, Wallace and Bosenberg, have described quasi-phase matching in U.S. patent application, Ser. No. 08/593,134, filed Sep. 1, 1996, now issued as U.S. Pat. No. 5,640,405. It also has been described by Fejer et al. in "Quasi-phase matched second harmonic generation: tuning and tolerances," IEEE Journal of Quantum Electronics, vol. 28, no. 11, 1992, pp. 2631–2654 and by Myers et al. in "Quasi-phase-matched optical parametric oscillators in bulk periodically poled LiNbO$_3$," Journal of the Optical Society of America B, vol. 12, no. 11, 1995, pp. 2102–2116.

Figure 5:
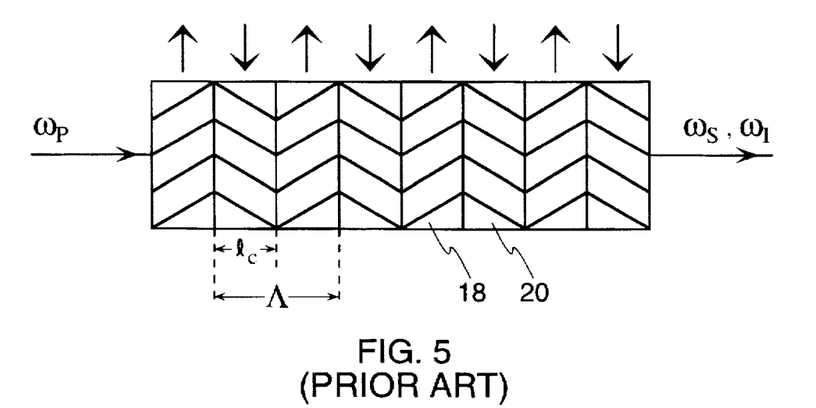
FIG. 5 is a schematic cross sectional view of a quasi-phase matching grating.

As illustrated in the schematic cross section of FIG. 5, the non-linear medium through which the three waves propagate is divided into alternating domains 18, 20 having a period $\Lambda$ that is twice the coherence length. This can be mathematically expressed as $$\Lambda = 2l_C = \frac{2\pi}{k_3 - k_2 - k_1}. \tag{9}$$

Each set of the alternating domains 18, 20 have a different non-linear characteristic. This periodic structure will be referred to as a QPM grating although light travels generally along the direction of the alternation and there is no substantial diffraction from the structure. Preferably for maximum effect, each domain 18, 20 has a length equal to the coherence length $l_c$, and the sign of the non-linear coefficient is reversed every coherence length along the propagation direction, the reversals being represented by the arrows in FIGS. 1 and 5. Thus, as soon as any dispersion causes the input and output signals to fall out of phase, the non-linear coefficient is changed so that, despite the new phase relationship, power continues to flow from the input to the output signal. For first-order quasi-phase matching, the non-linear power $I_{NL}$ continues to grow as shown by trace 22 in FIG. 1. This power is transferred from the two input signals if the process is a sum or difference process or from the pump source at $\omega_3=\omega_p$ to the idler and output signals $\omega_2=\omega_s$ and $\omega_1=\omega_I$ if the process is an optical parametric oscillator (OPO) process. For second-harmonic generation, a special case of a sum process, power is transferred from the single fundamental signals to the second-harmonic signal, with the power being transferred two photons at a time.

The more general form of Equation (2) above including the QPM interaction is $$\Delta k = k_3 - k_2 - k_1 K_m, \quad (10)$$

where $\Delta k$ is the phase mismatch and $K_m$ is the momentum wave vector provided by the QPM grating, specifically $$K_m = \pm \frac{2\pi}{\Lambda}. \quad (11)$$

For proper phase matching, $\Delta k$ needs to be made equal to zero. For bulk phase matching, $\Delta k$ can be made zero only by careful choices of the wave vectors $k_1$, $k_2$, and $k_3$. For quasi-phase matching, at least in theory, the wave frequencies $\omega_1$, $\omega_2$, and $\omega_3$ consistent with Equation (1) and the associated wave vectors $k_1$, $k_2$, and $k_3$ can be more freely chosen with $K_m$ of Equation (11) making up any mismatch. Note that for a given set of wave frequencies $\omega_1$, $\omega_2$, and $\omega_3$, the QPM grating will be required to provide a different value of the $K_m$ vector depending upon the wave polarizations because, as is shown in Equation (3), the birefringent dielectric constants $n_o$, $n_e$ produce different values for the three differently polarized optical wave vectors $k_1$, $k_2$, and $k_3$.

Odd-numbered, higher-order quasi-phase matching is also possible. Even numbered quasi-phase matching is also possible if the duty cycle in the grating differs from 50%.

A distinct advantage of quasi-phase matching is that dispersion can be compensated by means not relying on birefringence between the two waves. That is, input and output waves of the same polarization can be quasi-phase matched, which is not possible with pure birefringent phase matching as described with reference to FIG. 2. Non-linear processes are usually relatively weak so that it has been conventional to use interactions associated with the largest non-linearities. The three non-zero second-order non-linear tensor elements at 1064 nm for lithium niobate are given in TABLE 1.

TABLE 1

|  | ($10^{-12}$ m/V) |
| --- | --- |
| $d_{31}$ | −4.3 |
| $d_{22}$ | 2.1 |
| $d_{33}$ | −27 |

The largest non-linear coefficient by far is $d_{33}$ and this is the appropriate coefficient for QPM processes in which all three waves are polarized parallel to the z-axis, that is, all extraordinary waves in an eee process. Relying upon an eee process takes advantage, in $LiNbO_3$, of the largest nonlinear coefficient, $d_{33}$. All known prior art reporting experimental results for QPM gratings in $LiNbO_3$ use the $d_{33}$ coefficient.

Figure 6:
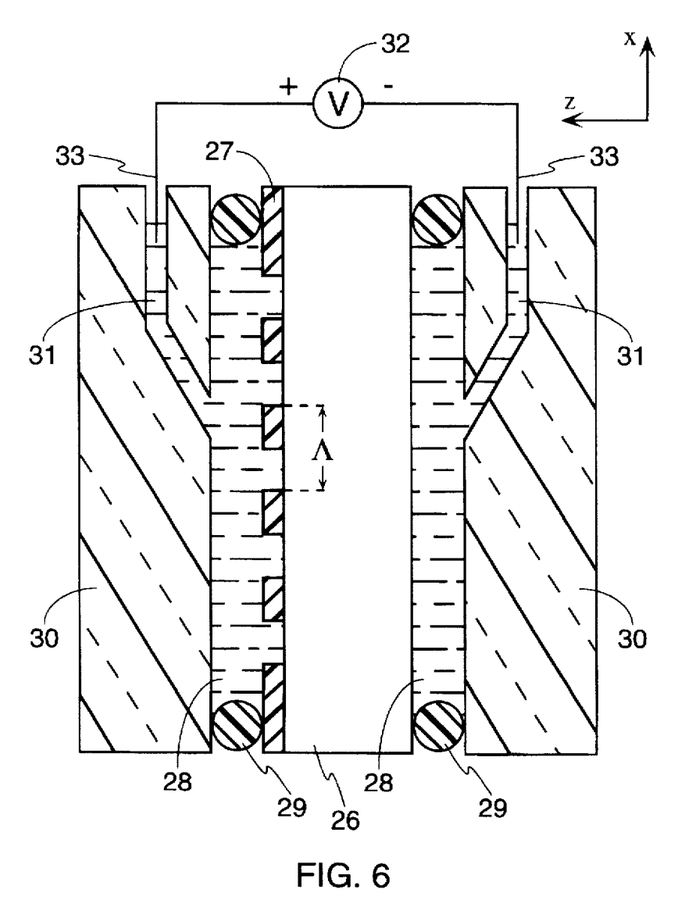
FIG. 6 is a schematic illustration, partially in cross section, of the poling of a ferroelectric non-linear medium.

An advantage of bulk $LiNbO_3$ as the non-linear crystal is that it can be periodically poled by an electrical technique since it is a ferroelectric material. Electrically poled QPM gratings have also been successfully achieved in other materials, such as $LiTaO_3$, and KTP, and the process has been applied to both bulk crystals and waveguides. Electrical poling can be applied to a large class of well known ferroelectric materials which will pole and thereafter remain in the poled state. Burns et al. disclose such a poling procedure in "Second Harmonic Generation in Field Poled, Quasi-Phase-Matched, Bulk $LiNbO_3$," *IEEE Photonics Technology Letters*, vol. 6, February 1994, pp. 252–254. Our normal procedure for achieving the QPM grating, as illustrated in the schematic view of FIG. 6, is to deposit to one of the z-directed faces of a $LiNbO_3$ wafer 26 a photoresist layer and pattern it into an inverse digitated grid 27 of period A. A conductive liquid 28 is encapsulated on each side of the wafer 26 by respective O-rings 29 and insulative plates 30 of, for example, Plexiglas. The conductive liquid 29 forms the interdigitated electrode on one side of the $LiNbO_3$ and a planar electrode on the other. More complex metallizations may be used to provide better resolution on the grid pattern.

The insulative plates are bored with bent holes 31 extending from their sides facing the conductive liquid 28 to the top of the structure assembled as illustrated so that the conductive liquid 28 nearly fills the bent holes 31 and is accessible from above. A voltage pulse source 32 has electrodes extending into the conductive liquid 28 in the bent holes 31. The pulse source 32 applies across the two conductive liquids 28 and hence the wafer 29 a electrical pulse with an amplitude above a known coercive voltage (10.5 kV for a 0.5 mm thick wafer). This electrical poling process flips the domains under the exposed areas in the photoresist layer 24 to the opposite direction from that of the remainder of the wafer 28. The poling procedure is a one-time process. Once the wafer 28 has been poled, the voltage source 32 is disconnected, the liquid-containing structure is disassembled, and the photoresist and any metallizations are removed. The domains are stable to temperatures above 800° C. and to voltages less than the coercive voltage. The poled wafer 28 is then used in an optical system for light propagating along the x-direction.

Unfortunately, in the poling process regions apart from but near the small electrode structure also have their domains flipped, usually some 3 to 4 µm past the edge of the electrode. For example, to make a grating with a 30 µm periodicity, we would use electrodes of width 30/2−7=8 µm to obtain the desired alternating 15 µm wide domain regions. This extra propagation of the flipped or inverted domains past the electrode edges causes a significant problem when it is desired to fabricate a structure with periods of less than 10 µm.

For example, following the above procedure, when a periodically poled 12 µm period is desired in 0.5 mm thick $LiNbO_3$ substrate, conductive strips of only 1.5 µm wide should be applied in alternation with nonconductive strips of 10.5 µm (a mark-to-space ratio of 12.5:87.5, that is, an electrode width of 12.5% of the electrode period and an inter-electrode gap of 87.5% of the period). When the voltage pulse is applied, the inverted domain forms under the conductive strip and propagates out to a width of close to 6 µm before it stops so that the resulting material has a 12 µm period with a duty cycle close to the optimum of 50%. Duty cycle is defined as the ratio of between the length of the resulting inverted domain and the total period. When the duty cycle varies much from 50%, the nonlinear coefficient is significantly decreased. Further decreases in poling periods below 10 or 12 µm can be accomplished only with special techniques that require state-of-the-art photomasks and photolithography.

Recently, intensive efforts have been expended to use periodically poled $LiNbO_3$ to achieve second-harmonic generation to produce visible light, particularly in the green and blue portions of the spectrum. These efforts have been stymied by the domain spreading described above. As is shown in the data presented by Fejer et al., for processes at shorter wavelengths, especially for doubling near-infrared laser lines to the visible region of the spectrum, the grating period Λ in $LiNbO_3$ for first-order quasi-phase matching for eee processes (utilizing the large $d_{33}$ coefficient) becomes shorter than 10 μm because of the increased dispersion in the visible portion of the spectrum.

For example, generation of blue light in QPM $LiNbO_3$ has received much attention for frequency doubling the 946 nm and 914 nm laser light obtained from Nd:YAG and Nd:$YVO_3$ lasing materials or the 800–980 nm light obtained from GaAlAs and InGaAs laser diodes and large-area high-power optical amplifiers. However, as the wavelength becomes shorter, the period of poling alternation (grating period) generally also becomes shorter. For example, in the conventional $d_{33}$ configuration in $LiNbO_3$, the first-order period for doubling the Nd:YAG 1319 nm line is 12.2 μm, for the Nd:YAG 1064 nm line is 6.5 μm, and for the Nd:YAG 946 nm line is 4.4 μm. These periods are for an operating temperature of 200° C., which prevents any enduring photorefractive damage in the $LiNbO_3$. Operation at lower temperatures will result in slightly larger periods, but the operation is short lived because of the photorefractive damage. The quoted periods for poling range from marginal to very difficult.

Pruneri et al. disclose one technique for reducing the poling period in "49 mW of cw blue light generated by first-order quasi-phase-matched frequency doubling of a diode-pumped 946-nm Nd:YAG laser", *Optics Letters*, vol. 20, December 1995, pp. 2375–2377. They succeeded in writing a 4.6 μm grating for second harmonic generation of 946 nm pump light in $LiNbO_3$ by using a mark-to-space ratio of 17:83 and restricting the crystal thickness to 0.2 mm. This means that their conductive strips are only 0.78 μm wide. With today's technology, fabricating such narrow features is not an easy task. For thicker crystals, the problem becomes even more difficult.

Figure 7:
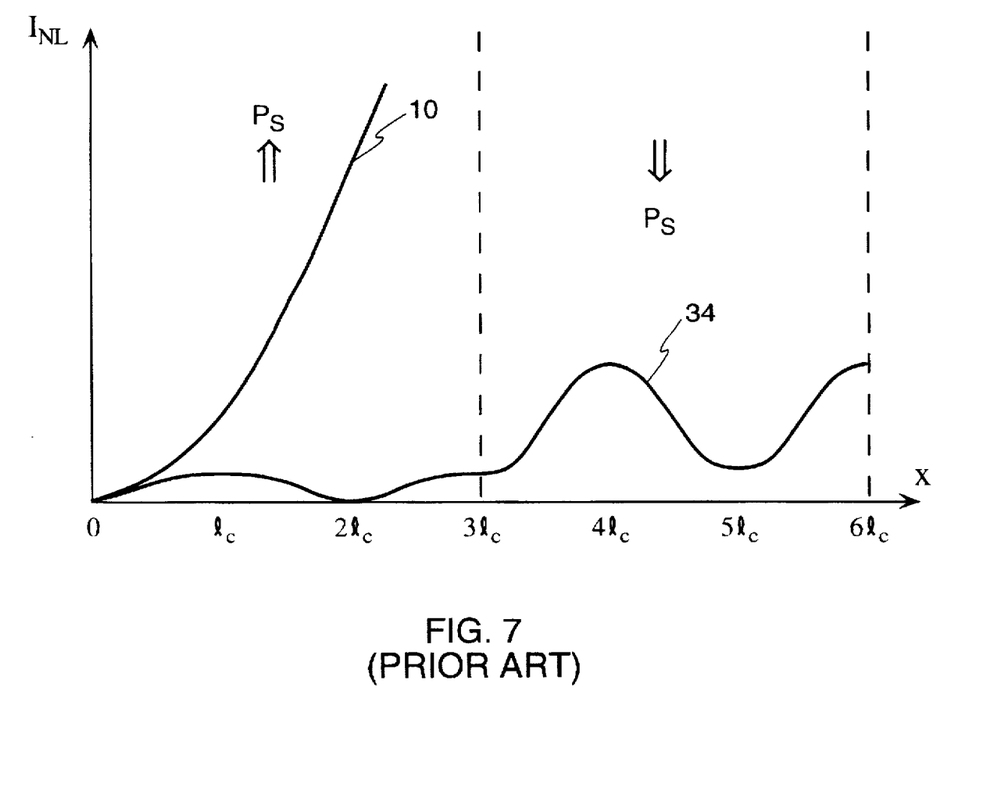
FIG. 7 is a graph, similar to that of FIG. 1, showing the flow of power in a third-order QPM process.
Figure 8:
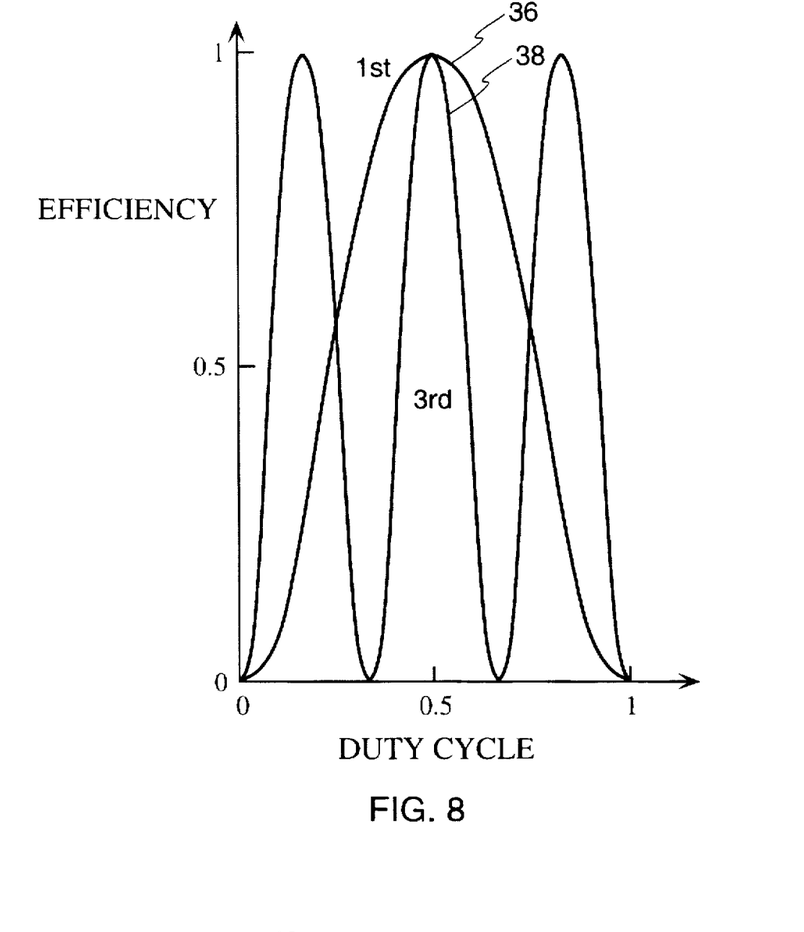
FIG. 8 is a graph of the dependencies of the optical conversion efficiencies in second-harmonic generation using respectively first and third order quasi-phase matched gratings.

Burns et al., ibid., disclose another technique for reducing the poling period. They write 13.4 μm gratings in 0.25 mm thick $LiNbO_3$ samples and then succeeded in operating them in the third-order mode to double 937 nm light. In third-order operation, the grating period A is three times the coherence length $l_c$ for the desired interaction. The non-linearly generated wave then grows as shown by curve 34 in FIG. 7. Clearly the resultant non-linear conversion efficiency is not as high as in first-order operation. Burns et al. conclude that periods of greater than 10 μm are readily achievable across 0.25 mm crystals, resulting in an efficient third order QPM grating for SHG light in the visible region. However, third-order QPM suffers not only from the fact that the effective non-linear coefficient is reduced by one-ninth, but more importantly from its sensitivity to any variations in the duty cycle of the QPM grating. Calculations have been made of the dependence of the efficiency η of QPM conversion upon the duty cycle of the QPM grating. Values η normalized to the peak of the first-order operation of the QPM grating are shown in the graph of FIG. 8. Curve 36 was calculated for first-order operation while curve 38 was calculated for third-order operation. These curves show that small variations of the duty cycle away from the optimum value of 50% produces much greater degradation in third-order operation than in first-order operation. If the duty cycle changes from 0.5 to 0.4 or 0.6, first-order operation results in a reduction in efficiency down to 90% of the maximum peak, but the third-order operation results in a much greater reduction down to below 40%. The previously described domain spreading makes it difficult to control small variations in duty cycle in poled $LiNbO_3$.

Hongwei Mao et al. disclose a different technique for fabricating QPM gratings in "Noncritical quasiphase-matched second harmonic generation in $LiB_3O_5$ crystal at room temperature," *Applied Physics Letters*, vol. 61, no. 10, September 1992, pp. 1148–1150. They take advantage of the lithium triborate crystal which is almost phase matched between orthogonally polarized fundamental and second-harmonic waves. However, a small birefringence remains, for which they compensate by a mechanical method. They polished several slabs of lithium triborate to a thickness of about ¼-mm thick slabs, equal to the coherence length, and then stacked them together so as to have alternating crystallographic orientations.

Accordingly, it is desired to provide a device for non-linear optical interactions that can produce light at shorter wavelengths.

It is also desired that the non-linear crystal in the device be operated at an elevated temperature to avoid photorefractive damage.

It is yet further desired to provide a quasi-phase matched device which does not require overly small grating periods.

SUMMARY OF THE INVENTION

The present invention includes quasi-phase matching gratings in a non-linear medium of a proper period that causes a quasi-phase matched interaction between waves of differing polarizations. For frequency doubling in uniaxial crystals, the pump wave may be of ordinary polarization and the output wave may be of extraordinary polarization. Other non-linear optical processes are possible in the quasi-phase matched non-linear medium using the natural birefringence of the medium, such as sum or difference frequency generation, or optical parametric interactions. This process can also be used in conjunction with or simultaneously with a QPM process that does not use the natural birefringence of the material to generate other output wavelength combinations.

DETAILED DESCRIPTION OF THE PREFERRED EMBODIMENTS

The invention relies upon using both the natural birefringence of the non-linear material and quasi-phase matching (QPM) gratings formed in the material to non-linearly generate strong radiation in parts of the optical spectrum not previously accessible by simpler interactions.

In one embodiment, the invention achieves frequency doubling (second-harmonic generation) in uniaxial non-linear crystals such as $LiNbO_3$ by utilizing waves of different polarization, at least one polarized in the x-y plane and another perpendicular to this plane. Referring to the curves 12, 14 of refractive index in FIG. 2, the mixed polarization allows two waves of substantially different wavelengths to have nearly but not quite equal refractive indices so that the QPM grating need not provide large values of $K_m$. The exact requirement of Equation (2) for bulk phase matching need not be satisfied, and a QPM grating may supply the extra momentum $K_m$ of Equation (7). The flexibility provided by the QPM grating allows the non-linear crystal to be operated at nearly arbitrary temperatures, in particular at temperatures that allow self-annealing against photorefractive effects. The QPM grating effectively can shift the operating temperature of the conventional birefringent second-harmonic generator.

Because the QPM grating needs supply only a small amount of momentum $K_m$, its grating period $\Lambda$ can be relatively long, well within the capability of periodically poled lithium niobate.

Another advantage of using a pump wave with ordinary polarization is that we have observed the effects of photo refraction to be much smaller for ordinarily polarized waves than for extraordinary polarized waves. This effect is important for intra-cavity second-harmonic generation in which the fundamental wave passes through the crystal up to a hundred times while the second-harmonic wave passes only once or twice. Thus, in intra-cavity second-harmonic generation even small amounts of photo refractive distortion add up to significantly degrade the device performance. Hence, a process such as the described ooe that utilizes the $d_{31}$ coefficient suffers less distortion than the conventional eee process that utilizes the $d_{33}$ coefficient.

A yet further advantage of the invention is that it allows the use of first-order quasi-phase matching rather than the second-order or third-order often required in the prior art for $d_{33}$ interactions. As has been explained above with reference to FIG. 8, first-order quasi-phase matching is much less sensitive to fabricational variations of duty cycles, such as the previously described fringing. The second-order and above phase matching have been conventionally used in order to utilize the large $d_{33}$ while using QPM grating periods comparable to those of the present invention. Nonetheless, the net efficiencies have often suffered because of fabricational errors.

As an example of the eased fabricational requirements allowed by the invention, a QPM grating can be used for ooe second-harmonic generation in $LiNbO_3$ to phase match an extraordinary pump wave, for example, at 1064 nm from a Nd:YAG laser with an ordinary second-harmonic wave at 532 nm, which is within the yellow-green band of the spectrum. The QPM grating period in this case is about 29 µm because the two waves, although at substantially different frequencies, have nearly equal refractive indices because of their differing polarizations. When $LiNbO_3$ is being used as the non-linear crystal, the relevant non-linear optical tensor element for the ooe interaction is $d_{31}$. Although its value is only one-seventh that of $d_{33}$ for the eee interaction, it has been shown to be sufficiently high to achieve second-harmonic generation.

In contrast, to achieve quasi-phase matched frequency doubling with the eee interaction requires a QPM grating with a period of 6.5 µm. As stated before, such a short period is difficult to obtain, particularly by electrical poling.

EXPERIMENT

The top surface of a test crystal of $LiNbO_3$ was patterned along its x-axis with a number of electrical poling interdigitated electrodes, as described above, so as to produce a number of QPM gratings with periods in the range of 24 to 32 µm. The crystal was oriented with its z-axis normal to the crystal and the direction of light propagation was along with x-axis.

Figure 9:
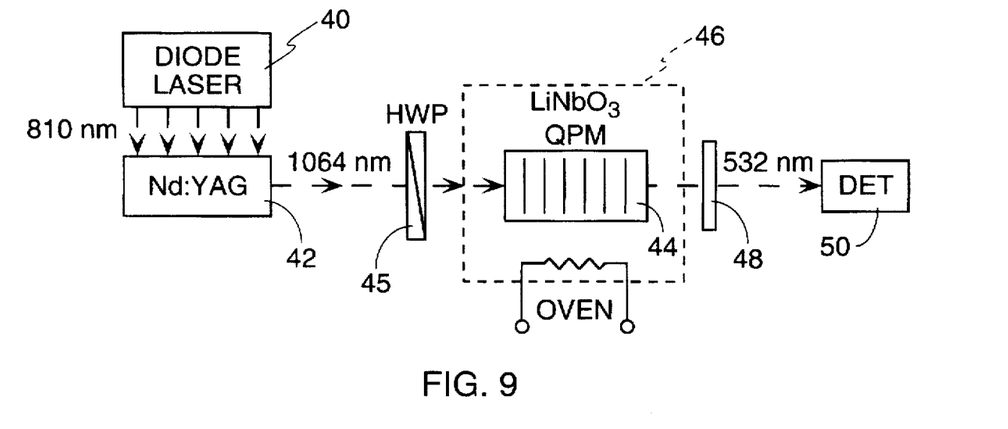
FIG. 9 is a diagram of an optical experiment used to verify the invention.

An experimental setup is schematically illustrated in FIG. 9. The patent to Byer et al. provides more details of the optical setup. A laser diode array 40 irradiates a laser rod 42 of Nd:YAG with an intense laser beam of 810 nm pump light. The rod 42 lases and irradiates a $LiNbO_3$ crystal 44 having the QPM grating structure described above. A half-wave plate 45 or other polarization-determining technique is set to cause the beam incident on the $LiNbO_3$ 44 to have an ordinary polarization, that is, the beam's electrical polarization lying in the plane of the crystal 44 and transverse to the z-direction in which the crystal has been poled. The $LiNbO_3$ QPM structure 44 is enclosed in a resistively heated oven 46. The optical output of the QPM structure 44 is filtered by a narrow band filter 48 passing radiation at the frequency-doubled wavelength of 532 nm. An optical detector 50 measures the optical intensity of the 532 nm beam.

Figure 10:
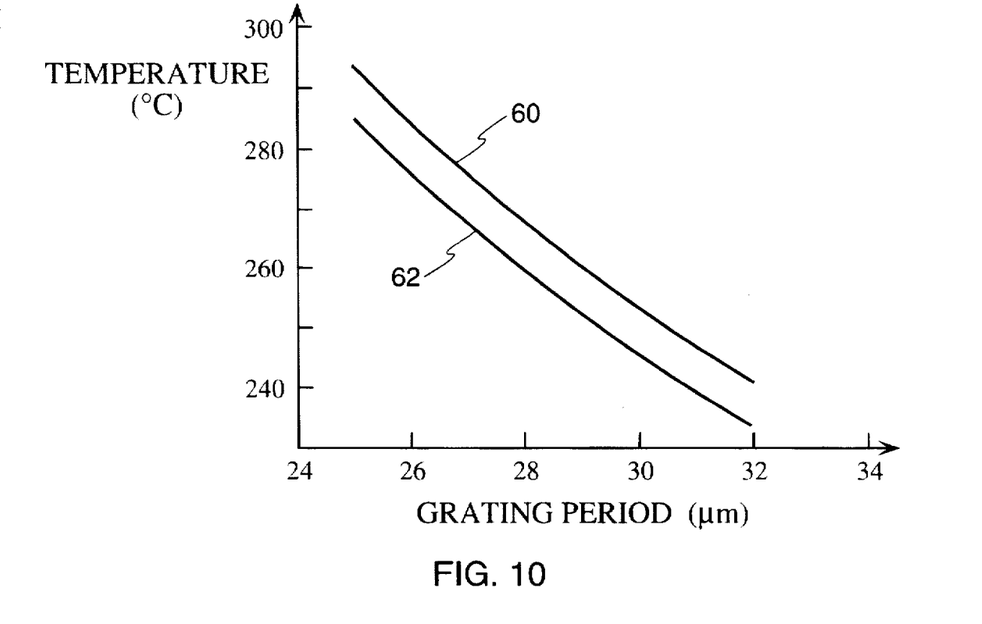
FIG. 10 is a graph of experimental and theoretical data for the relationship between grating period and the temperature of maximum frequency-doubling.

In the experiment, each of fifteen QPM gratings was successively inserted into the beam, and the temperature was varied while the detector 50 measured the 532 nm intensity. Curve 60 in FIG. 10 shows the experimentally determined temperature at which the intensity of the 532 nm beam was maximized for a given QPM grating period. Curve 62 gives a theoretical calculation of the dependence assuming an ooe interaction for frequency doubling.

These results show a number of important points. Second-harmonic generation is possible using relatively large QPM grating periods. The second-harmonic generation can be performed in $LiNbO_3$ at temperatures well above the self-annealing temperature. The temperature dependence is significant with the result that the interaction can be tuned by variations in temperature within a comfortable range.

The single pass of the 1064 nm pump light through the frequency-doubling QPM structure 44 produces conversion efficiencies only in the range of $10^{-5}$. There are several well-known techniques to significantly increase the conversion efficiency. In one, the QPM structure 44 is placed in an optical cavity that is resonant at the wavelength of the pump radiation. In another, a recirculating path is created for the pump radiation so that it successively passes through the QPM structure 44.

In another experiment, we determined that a QPM grating in LiNbO$_3$ having a grating period of 12.2 μm could frequency double 946 nm light to 473 nm with the crystal held at 210° C.

The setup of FIG. 9 was intended primarily to experimentally verify the operation of the invention. Because of the single pass of the pump radiation through the QPM structure 44, the efficiency of conversion was limited to about $10^{-5}$.

Figure 11:
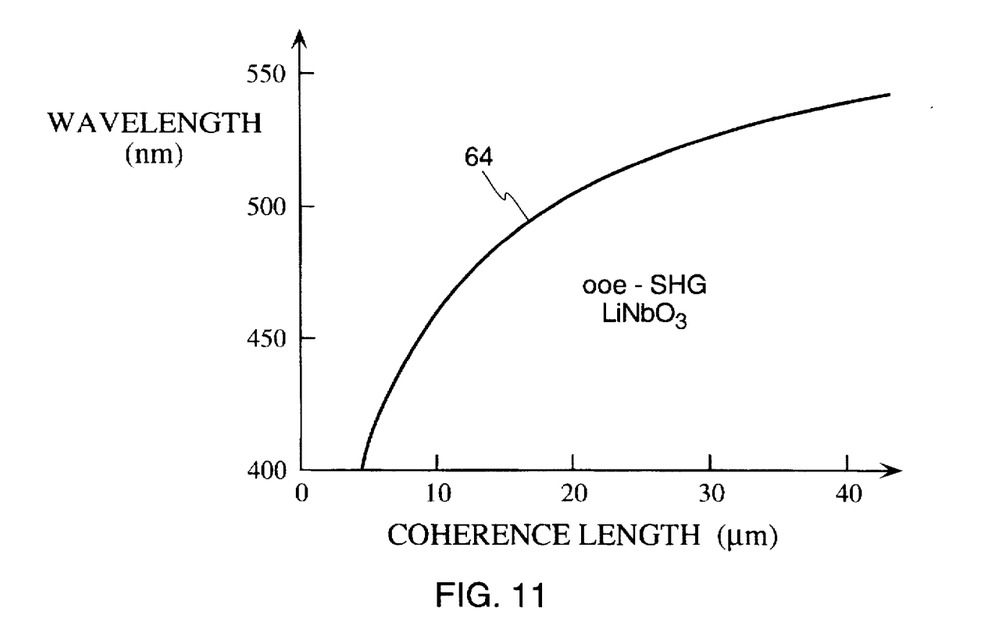
FIG. 11 is a graph of the QPM grating period required for frequency doubling into portions of the blue spectrum.

Curve 64 in FIG. 11 is a theoretical calculation of the QPM grating period required to frequency-double light into the blue portion of the spectrum. The curve 64 is given as a function of the second-harmonic wavelength. The calculations assume an ooe interaction in congruent LiNbO$_3$ held at 220° C. Semiconductor laser diodes of GaAlAs and InGaAs are available in the 800 to 980 nm band to provide pump light at the fundamental wavelength. Standard electrical poling techniques can be used to form gratings with the periods required to generate blue light down to about 460 nm, which is within the violet portion of the spectrum.

The above description and its terminology relied upon the uniaxial crystal symmetry of LiNbO$_3$. However, very similar effects are available in other uniaxial crystals and even biaxial crystals although the terminology and description become much more complicated. Roberts has discussed the relationship between uniaxial and biaxial effects in "Simplified characterization of uniaxial and biaxial nonlinear optical crystal: a plea for standardization of nomenclature and conventions," *IEEE Journal of Quantum Electronics*, vol. 28, no. 10, 1992, pp. 2057–2074. In general terms, the invention requires the interaction between orthogonally polarized light waves in either uniaxial or biaxial non-linear materials.

The broadest aspects of the invention are not limited to frequency doubling or to the ooe interaction. Other phase matching processes are also possible such as oeo etc. There are three factors which will determine which of these different polarization combinations are meaningful for a particular non-linear crystal. They are:

(a) the birefringence of the crystal, if uniaxial whether it has positive or negative birefringence and if biaxial the ordering of the three indices in magnitude;

(b) the dispersion of the indices of refraction; and (c) the allowed couplings and magnitudes of the non-linear coefficients $d_{ij}$.

Non-linear coefficients vary between materials. In LiNbO$_3$, the $d_{33}$ coefficient for the eee process is approximately 7 times larger than the $d_{31}$ coefficient for the ooe process. Therefore, from a point of view of maximizing the non-linear conversion efficiency, the eee process is much preferred. However, for many applications, the $d_{31}$ interaction is perfectly acceptable, and if one cannot manufacture the proper QPM grating period to use $d_{33}$, the utility of the $d_{31}$ interaction is obviously vastly superior. This variation is not unique. For example, in LiIO$_3$, another common non-linear crystal with slightly different symmetry properties, $d_{33}$ and $d_{31}$ are approximately equal so that the birefringent phase matching of the invention favors $d_{31}$. Many of these values are given in the cited article by Roberts.

The invention can be advantageously applied to more complex systems in which multiple phase-matched interactions can occur simultaneously. One such system, as illustrated schematically in FIG. 12, uses a single QPM crystal 60 to produce two infrared wavelengths by operating as an optical parametric oscillator as well as to produce a visible wavelength by operating as a second-harmonic generator. The incident pump radiation is obtained from a Nd:YAG laser operating at 1064 nm. The LiNbO$_3$ crystal 60 is formed with a QPM grating having a 29 μm grating period and is placed inside a singly resonant optical parametric oscillator cavity defined by two narrow-band mirrors 62, 64 that are highly reflecting at either 1534 nm or 3473 nm but are otherwise generally transmissive. The pump signal at 1064 nm incident on the 29 μm QPM grating generates an output signal at 1534 nm and an idler at 3473 nm. Either the output signal or the idler can be resonated by the mirrors 62, 64. This parametric process is an eee process using the larger $d_{33}$ coefficient. Another process can simultaneously occur within this same 29 μm QPM crystal in which the 1064 nm radiation is frequency-doubled to 532 nm radiation. However, this later process is an ooe process requiring the pump light to be polarized parallel to the surface of the LiNbO$_3$ crystal 60 while the former process, being an eee process, requires the pump light to be polarized normal to the crystal surface. Therefore, the 1064 nm radiation to be doubled must be polarized perpendicularly to that which pumps the OPO process. This is easily accomplished with a half-wave plate 66. Other well-known means can be used to control the polarization direction, which rotates the polarization state of the input 1064 nm radiation so that both polarizations are present in the crystal 60. In fact, the rotation of a linear 1064 nm input through 90 degrees allows a continuously variable division of 1064 nm radiation into the two processes.

Figure 12:
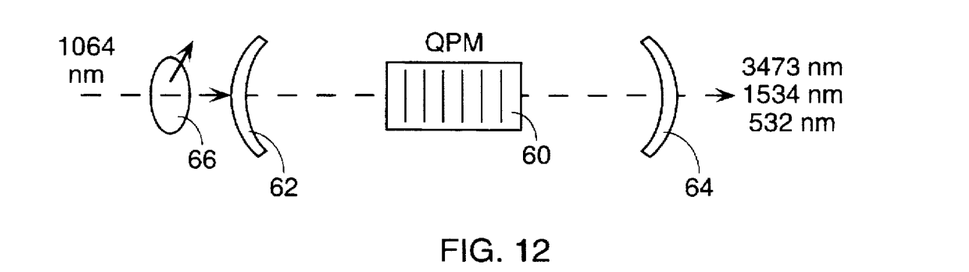
FIG. 12 is a diagram of an optical system used to generate more than one wavelength.
Figure 13:
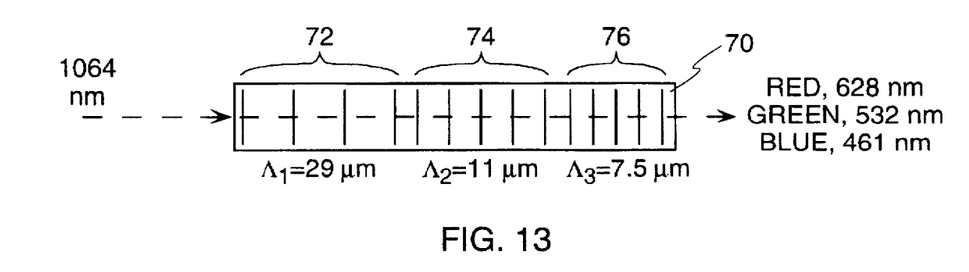
FIG. 13 is a plan view of a non-linear crystal having three QPM gratings formed therein for generating red, green, and blue light by different processes.

The system of FIG. 12 is useful as it has been described, but it becomes even more useful because the frequency sum of the 1064 nm pump signal and the 1534 nm infrared output corresponds to a red wavelength of 628 nm. That is, a non-linear interaction between the pump signal and the infrared output produces a red output. Similarly, the frequency sum of the green frequency-doubled radiation at 532 nm and the infrared output signal at 3473 nm will produce blue radiation at 461 nm. These three visible wavelengths are almost ideal for a red-green-blue laser display system. These two sums could be generated in separate crystals, or could be added to the end of an OPO/SHG crystal 70 of congruent LiNbO$_3$, as illustrated in FIG. 13, which is assumed to operate at 220° C. A first QPM grating 72 has a relatively long period of 29 μm designed for both the second-harmonic generation and the parametric process generating 532 nm, 1534 nm and 3473 nm, as described above. A second QPM grating 74 is designed for the eee sum process generating the red 628 nm radiation. A third QPM grating 76 is designed for the eee sum process generating the blue 461 nm radiation. The order of the second and third gratings 74, 76 may be reversed. As an eee process, the sum frequency to produce the red requires a grating period of 11.0 μm for the second grating 74, which is at the edge of but within our ability to produce. For the blue generation, the grating period of the third grating 76 is 7.5 μm for an eee process. This process would be convenient in that the polarizations are already in the proper position for an eee process, but the fabrication of the short grating period is quite difficult, especially at convenient crystal thicknesses of 0.5 mm or greater, the problem having been described above.

Figure 14:
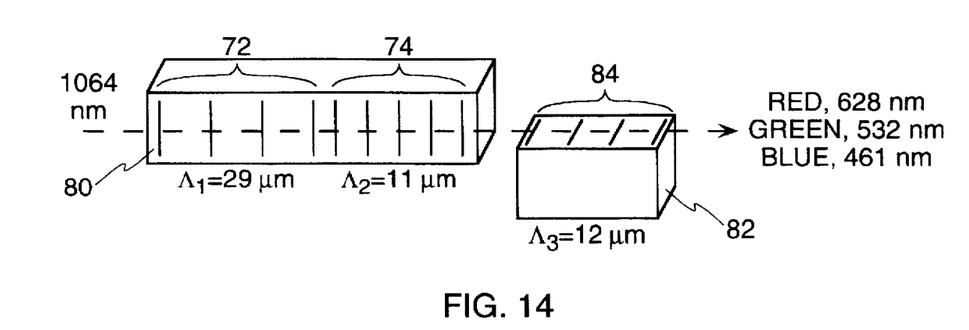
FIG. 14 is a perspective view of two non-linear crystals for generating the same red, green, and blue light but by a somewhat different process than in FIG. 13.

Much easier grating fabrication can be performed for the optical system illustrated orthographically in FIG. 14. A first LiNbO$_3$ crystal 80 includes the two QPM gratings 72, 74 for generating the red light at 628 nm and green light at 532 nm, as previously described. A second LiNbO$_3$ crystal 82 is rotated to have its surface with the z-axis and the associated poling electrode fingers oriented perpendicularly to z-axis of the first crystal 80. A QPM grating 84 with a grating period of 12 μm is poled into that face. This grating 84 at a temperature of 220° C. for the LiNbO$_3$ quasi-phase matches an ooe process between the infrared at 3473 nm, the green at 532 nm, and the generated blue at 461 nm. Unillustrated means, such as dichroic mirrors, may be used to separate the red, green, and blue radiation. The embodiment shows a single optical axis passing through all the gratings 72, 74, 84 of the two crystals 80, 82. It is of course understood that additional optics may be interposed along the optical path between the two crystals 80, 82 as long as a unique set of polarization directions can be identified along the portions of the path in the two crystals 80, 82.

It is noted that the same ooe process for generating blue light is birefringently phase matched (bulk phase matching without the use of QPM grating 84) at a temperature of 360° C. This last example shows the versatility of being able to apply different polarization and birefringent combinations to assemble practical devices to generate other wavelengths through nonlinear processes.

The invention is not limited to the described embodiments but may be applied to other materials, wavelengths, and processes for obtaining high-intensity light. Non-linear materials and ferroelectrics other than LiNbO$_3$ may be used in some aspects of the invention. For some aspects of the invention, electrical poling is not an essential feature of the invention.

The invention is particularly useful as a second-harmonic generator of light in the blue and green portions of the spectrum from available sources in the band of 800 to 1200 nm, but other optical processes are also covered by aspects of the invention. The invention is applicable to optical outputs in the technically challenging blue-green portion of the optical spectrum, herein defined as having wavelengths extending between 450 and 550 nm, but the invention as well facilitates optical outputs in the yellow portion of the spectrum with wavelengths extending upwards in wavelength to 590 nm. The violet and ultraviolet portions of the optical spectrum at wavelengths below 450 nm present substantial challenges, which may be addressed by the invention. Although frequency doubling is an important application, the invention applies to other non-linear processes.

The invention thus provides a simple and economical technique for obtaining high-intensity light in portions of the spectrum that had previously presented many difficulties in generating intense radiation.

What is claimed is:

1. A second-harmonic generator, comprising:
   a source of pump light having a first frequency; and
   a non-linear optical material having formed therein an alternating structure of differing non-linear characteristics having a period such that said alternating structure quasi-phase matches said pump light from said source incident upon said structure and having a first polarization with an optical output exiting said structure, having a second frequency equal to twice said first frequency, and having a second polarization orthogonal to said first polarization.

2. The second-harmonic generator of claim 1, wherein said material into which said structure is formed comprises a ferroelectric.

3. The second-harmonic generator of claim 2, wherein said material is chosen from the group consisting of LiNbO$_3$, LiTaO$_3$, and LiIO$_3$.

4. A second-harmonic generator, comprising:
   a source of pump light having a first frequency and having a first polarization;
   a non-linear optical material having formed therein an alternating structure of differing non-linear characteristics having a period such that said alternating structure quasi-phase matches said pump light from said source incident upon said structure with an optical output exiting said structure, having a second frequency equal to twice said first frequency, and having a second polarization orthogonal to said first polarization; and
   a heater for maintaining said material above 100° C.

5. A light generating device, comprising:
   a source of a beam of light of a first wavelength;
   a polarizer intercepting said beam and causing said light to be polarized in a first direction;
   an electrically polable ferroelectric material disposed to intercept said beam after said polarizer upon which said light is incident polarized in said first direction and having a first quasi-phase matching grating formed therein extending along a second direction perpendicular to said first direction and having an alternating non-linear optical characteristic with respect to a third direction perpendicular to said first and second direction, said grating being formed with said alternating non-linear optical characteristic to have a grating period along said second direction.

6. A light generating device, comprising:
   a source of a beam of light of a first wavelength;
   a polarizer intercepting said beam and causing said light to be polarized in a first direction;
   an electrically polable ferroelectric material disposed to intercept said beam after said polarizer and having a first quasi-phase matching grating formed therein extending along a second direction perpendicular to said first direction and having an alternating non-linear optical characteristic with respect to a third direction perpendicular to said first and second direction, said grating being formed with said alternating non-linear optical characteristic to have a grating period along said second direction, wherein a grating period of said quasi-phase matching grating is greater than 10 μm.

7. A light generating device, comprising
   a source of a beam of light of a first wavelength, wherein said first wavelength is in a range between 0.8 μm and 1.2 μm;
   an electrically polable ferroelectric material disposed to intercept said beam after said polarizer and having a first quasi-phase matching grating formed therein extending along a second direction perpendicular to said first direction and having an alternating non-linear optical characteristic with respect to a third direction perpendicular to said first and second direction, said grating being formed with said alternating non-linear optical characteristic to have a grating period along said second direction.

8. The light generating device of claim 5:
   further comprising a second quasi-phase matching grating formed in said electrically polable ferroelectric material extending along said second direction and having an alternating non-linear optical characteristic with respect to said third direction; and wherein one of said first and second gratings quasi-phase matches a sum-frequency process and the other of said first and second gratings quasi-phase matches a difference-frequency process.

9. A light source, comprising:
a ferroelectric material periodically poled along a first direction with a grating period of at least 10 μm; and
a source of light having a first wavelength of less than 1200 nm and irradiating said ferroelectric material to produce an output beam light having a second wavelength different than said first wavelength;
wherein said ferroelectric material is poled to form a quasi-phase match grating having said grating period to quasi-phase match in first order said light having said first wavelength with said output beam light having said second wavelength.

10. The light source of claim 9, wherein said light having said first wavelength is polarized in a first polarization direction and said output beam light having said second wavelength is polarized in a second polarization direction orthogonal to said first polarization direction.

11. The light source of claim 10, wherein said second wavelength is within a blue-green-yellow portion of the spectrum extending from 450 nm to 590 nm.

12. The light source of claim 9, wherein said second wavelength is half of said first wavelength.

13. A light generating assembly for operating upon a beam of light incident thereupon, comprising:
a first substrate comprising a non-linear material into a first surface of which directed toward a first direction is formed a first quasi-phase matching grating of alternating optical non-linear characteristics formed along a first axis;
a second substrate comprising a non-linear material into a second surface of which directed toward a second direction is formed a second quasi-phase matching grating of alternating optical non-linear characteristics formed along a second axis;
wherein an optical path is formed including said first and second axes and said first and second directions are substantially offset from each other with respect to a polarization direction of said optical path.

14. The light generating assembly of claim 13, wherein said first and second directions are substantially perpendicular to each other with respect to said polarization direction.

15. The light generating assembly of claim 13, wherein both said non-linear materials comprise respective electrically polable ferroelectric materials.

16. A method of producing from a source of a radiation of a first frequency high-intensity radiation of a second frequency different than said first frequency, comprising the steps of:
electrically periodically poling a crystal of a non-linear material to have a grating structure with a period to quasi-phase match a first polarization of said radiation of said first frequency with a second polarization of said radiation of said second frequency, said first and second polarizations being orthogonal; and radiating said crystal from said source with said radiation of said first frequency and of said first polarization to thereby produce radiation of said second frequency and of said second polarization.

17. A method of producing from a source of a radiation of a first frequency high-intensity radiation of a second frequency different than said first frequency, comprising the steps of:
electrically periodically poling a crystal of a non-linear material to have a grating structure with a period to quasi-phase match a first polarization of said radiation of said first frequency with a second polarization of said radiation of said second frequency, said first and second polarizations being orthogonal;
radiating said crystal from said source with said radiation of said first frequency and of said first polarization to thereby produce radiation of said second frequency and of said second polarization maintaining said crystal during said radiation step at a temperature above which photorefractive effects anneal in said material; and
maintaining said crystal during said radiating step at a temperature above which photorefractive effects anneal in said material.

18. The method of claim 17, wherein said material comprises LiNbO$_3$ and said temperature is at least 200° C.

19. The method of claim 16, wherein said material comprises a perovskite material.

20. The method of claim 19, wherein said perovskite material is chosen from the group consisting of LiNbO$_3$, LiTaO$_3$, and LiIO$_3$.

21. The method of claim 16, wherein said second frequency is twice said first frequency, thereby effecting second-harmonic generation.

22. The second harmonic generator of claim 1, wherein said first polarization of said pump light incident upon said structure comprises an ordinary polarization relative to said non-linear optical material and said second polarization comprises an extraordinary polarization relative to said non-linear optical material.

23. The light generating device of claim 5, wherein said first direction is a direction of ordinary polarization of relative to said alternating non-linear optical characteristic.

24. The light source of claim 9, wherein said source of light irradiating said ferroelectric material with light having an ordinary polarization with respect to said ferroelectric material and said output beam light has an extraordinary polarization with respect to said ferroelectric material.

25. The method of claim 16, wherein said first polarization being ordinary with respect to said crystal.

26. The light source of claim 9:
further comprising a second quasi-phase matching grating poled in said ferroelectric material along said second direction; and
wherein one of said first and second gratings quasi-phase matches a sum-frequency process and the other of said first and second gratings quasi-phase matches a difference-frequency process.

* * * * *